United States Patent [19]
Davey

[11] Patent Number: 6,104,456
[45] Date of Patent: Aug. 15, 2000

[54] LIQUID CRYSTAL DISPLAY USING CIRCULAR POLARIZED LIGHT AND LIGHT EMITTING SCREEN

[75] Inventor: Anthony B Davey, Bishops Stortford, United Kingdom

[73] Assignee: The Secretary of State for Defence in Her Britannic Majesty's Government of the United Kingdom of Great Britain and Northern Ireland, Farnborough, United Kingdom

[21] Appl. No.: 09/171,419

[22] PCT Filed: Apr. 16, 1997

[86] PCT No.: PCT/GB97/01058

§ 371 Date: Oct. 19, 1998

§ 102(e) Date: Oct. 19, 1998

[87] PCT Pub. No.: WO97/39379

PCT Pub. Date: Oct. 23, 1997

[30] Foreign Application Priority Data

Apr. 18, 1996 [GB] United Kingdom ............ 9607994

[51] Int. Cl.[7] ................................. G02F 1/133
[52] U.S. Cl. ................................ 349/71; 349/98
[58] Field of Search ............... 349/71, 98, 115, 349/164, 175, 104

[56] References Cited

U.S. PATENT DOCUMENTS

| | | | |
|---|---|---|---|
| 5,295,009 | 3/1994 | Barnik et al. | 349/98 |
| 5,325,218 | 6/1994 | Willett et al. | 349/98 |
| 5,548,422 | 8/1996 | Conner et al. | 349/98 |
| 5,666,174 | 9/1997 | Cupolo, III | 349/64 |
| 5,989,461 | 11/1999 | Coates et al. | 252/585 |
| 6,007,745 | 12/1999 | Coates et al. | 252/585 |

FOREIGN PATENT DOCUMENTS

| | | |
|---|---|---|
| 0 407 830 | 1/1991 | European Pat. Off. . |
| 0 578 302 | 1/1994 | European Pat. Off. . |
| 95 27920 | 10/1995 | WIPO . |

*Primary Examiner*—Kenneth Parker
*Attorney, Agent, or Firm*—Nixon & Vanderhye P.C.

[57] ABSTRACT

A display makes use of circularly polarised activation light; to this end it comprises a liquid crystal cell (7) acting as a half-wave plate so as to reverse the handedness of incident light in one setting and not to affect the handedness in another, and a filter (9) such as a cholesteric mirror for passing only that part of the light from the liquid crystal that has a predetermined handedness. When the light is passed by the filter (9), it strikes a photoluminescent screen (12), causing it to emit visible light for the display. The nematic cell is easy to produce and to switch, and the display does not need polarisers.

10 Claims, 1 Drawing Sheet

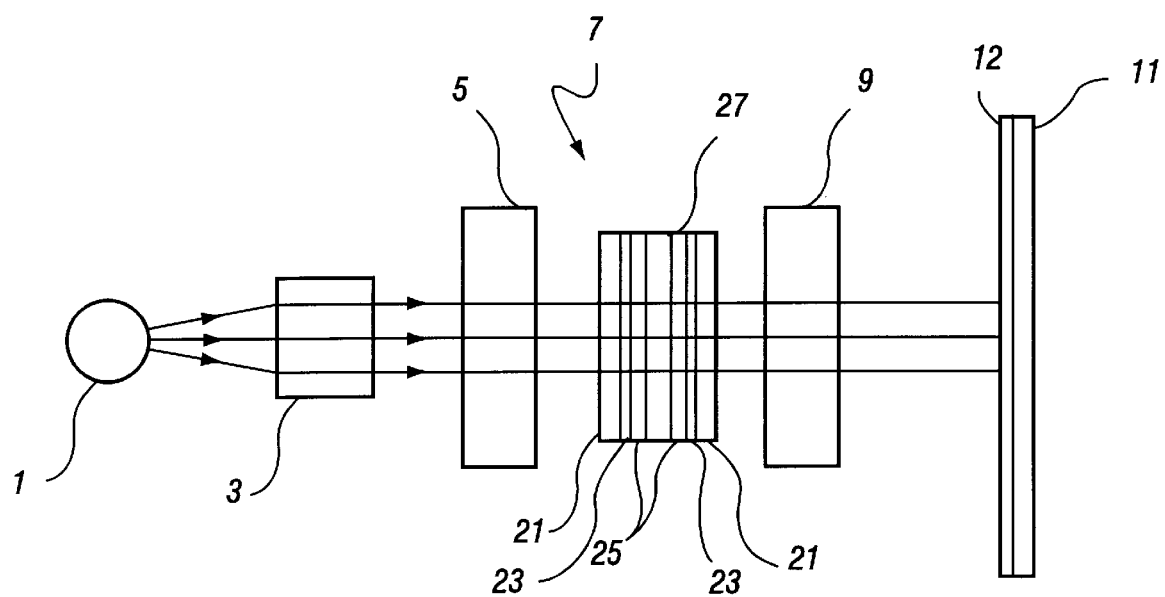

LIQUID CRYSTAL DISPLAY USING CIRCULAR POLARIZED LIGHT AND LIGHT EMITTING SCREEN

This application relates to a liquid crystal element, more particularly to one suitable for use in liquid crystal display applications.

Prior art switches using cholesteric mirrors are known, for example, from the Conference Proceedings of the 13th International Display Research Conference, Strasbourg, Aug. 31–Sep. 3, 1993, pages 317–320 in the article entitled 'Applications of cholesteric mirrors in the study of electrooptic effects in liquid crystals' by Kerllenevich and Coche. This article describes fast switches for use in modulating laser (and hence monochromatic) light beams. The switches have either twisted or 'homogenous' nematic liquid crystal cells between cholesteric mirrors. The first cholesteric mirror or filter passes only light of one circular polarisation. The liquid-crystal cell is switched between a neutral and a half-wave state, the former having no relevant effect and the latter reversing the handedness of the light. The second cholesteric mirror then blocks (or passes) the circularly polarised light depending on its direction of circular polarisation, i.e. right or left handed.

In the case of homogenous liquid crystals, the curves of intensity against voltage have multiple peaks, and have to be used with both transmission-off and transmission-on voltages away from zero volts. This makes the cells difficult to use in multiplexed liquid crystal display applications in which the voltage cannot be held at precise levels. Other examples relate to twisted or supertwisted nematic cells between cholesteric mirrors, which have much better voltage characteristics.

According to the invention there is provided a display element having a modulator for circularly polarised activation light comprising a liquid crystal cell which reverses the handedness of incident light in one setting and does not affect the handedness in another and a filter for passing only that part of the light from the liquid crystal that has a predetermined handedness; and, preferably, a photoluminescent screen which emits visible light when the activation light passed by the filter is incident upon it.

Advantageously, the filter passing light only of one handedness is a cholesteric mirror. The display element also advantageously comprises another cholesteric mirror to provide the circularly polarised activation light from a randomly polarised source. The display element according to the invention can thus avoid the use of the linear polarisers associated with standard liquid crystal cells and so is particularly beneficial for use with incident ultra-violet light, since ultraviolet polarisers have low transmission coefficients.

The cholesteric mirrors are preferably of opposite handedness. This means that the state in which the polarisation is not changed, normally achieved by applying a voltage, is the dark state This in turn results in a higher contrast than having cholesteric mirrors of the same handedness since in the switched state small errors in the cell thickness or other parameters will not result in the unwanted passage of light, while the cell will still pass most of the light when unswitched.

However, for applications requiring high brightness and for which contrast is less important the cholesteric mirrors may have the same handedness. This version has the advantage that only one type of cholesteric mirror need be produced. The chiral nature of the liquid crystals in the cholesteric mirrors can result in one handedness of cholesteric mirror being, as at present, more difficult to produce, and hence expensive. The increased transmission in the on state, which approaches 100% in this case, can also be highly advantageous.

For most applications, such as when using cholesteric filters, the display element is adapted to work with incident light of a predetermined wavelength. The light may be UV light, in particular UVA light, or it may be visible light.

The photoluminescent screen converts the incident light at the predetermined wavelength into the desired frequency or frequencies of visible light and to this end can incorporate phosphor material. For a coloured display the screen can have phosphors of different colours, normally red, green and blue, to build up the image. Since some of the components used only work or work best at a predetermined wavelength of light, this invention permits techniques to be used with coloured displays that were not previously thought possible.

Liquid crystal displays using W and emitters are known, for example from WO95/27920 (Crossland et al). In those displays ultra-violet (UV) light in a narrow band was modulated using a standard liquid crystal cell and was then incident on a phosphor which emits visible light. Arrays of cells and phosphors were used to build up the display. This principle is also used in the present invention.

The liquid crystal cells in the modulator of the invention preferably have two transparent plates with an electrode on each plate, sandwiching the liquid crystal. The liquid crystal cell is preferably nematic. This gives the advantage of a wide choice of materials and ease of alignment as compared with a device using, for example, a cholesteric liquid crystal.

In the unswitched state the molecules of the nematic liquid crystal lie approximately parallel to the plates, oriented in a predetermined direction. The reversal of the circular polarisation occurs because of the birefringence of the liquid crystal. The effective refractive index for light with a linear polarisation parallel to the orientation is different from the effective refractive index for light with a linear polarisation in the plane of the cell and perpendicular to the orientation. The cell is designed to act as a half-wave plate, meaning that after traversing the cell light with one linear polarisation is given a phase shift of half a cycle with respect to light with the perpendicular linear polarisation, which reverses the handedness of circular polarisation of the light.

To obtain the half-wave effect the liquid crystal cell should have a thickness d approximately satisfying the equation $$\Delta n \cdot d = (i+1/2)\lambda \tag{1}$$

in which i is zero or a positive integer, $\Delta n$ is the birefringence of the liquid crystal in the cell and $\lambda$ is the predetermined wavelength. It is best to determine the exact thickness by experiment for each type of cell and liquid crystal chosen. The choice of different values of i gives the advantage of permitting some variation in the thickness.

In the switched state, on the other hand, the application of a voltage orients the liquid crystal into the "homeotropic" state in which the molecules lie generally perpendicular to the plates. There is no observable birefringence, and each orientation of linearly polarised light is affected equally by the cell. The handedness of circularly polarised light passing through the cell is therefore not changed.

The liquid crystal in the cell may be parallel planar aligned. In this arrangement all the molecules are made to lie in the same direction throughout the thickness by providing a suitable alignment means on the liquid crystal side of the transparent sheets. The alignment means may be for example a rubbed polymer layer, a polarised W treated polymer, oxides or fluorides evaporated onto the transparent sheet at a glancing angle of incidence, or microgrooves Alternatively, a twisted nematic may be used. This differs from the parallel planar aligned cell in that the orientation directions on the two plates are perpendicular and the molecules are arranged in a helix. Normal twisted nematic displays rely on the rotation of the linear polarisation of light. In the display element according to the invention the important factor is change in polarity of circularly polarised light, which occurs in the manner described above, except with the additional effect of the rotation of the plane of linear polarisation. Since polarisers are not used this effect is of no consequence. Twisted nematic cells have however a sharper characteristic response with respect to applied voltage, making them easier to multiplex.

Similarly, a supertwisted nematic liquid crystal may be used. The difference here is that in the unswitched state the liquid crystal rotates by over 90°, usually between a half and a full circle, between the two plates. Again the key factor is the birefringence.

Another kind of cell that can be used in the present invention is the π-cell half-wave retarder described in 'New LC/CRT field sequential color display' by Vatne et al, published in the proceedings of the SID, volume 25/I, 1984, pp.31–34. In this cell the alignment direction is the same on the top and bottom plates, which results in a cell that can switch very quickly. Once again the cell operates as a half-wave cell.

The invention also comprises a liquid crystal display with a collimator and a display element as described above. Advantageously, the liquid crystal display further comprises a source of monochromatic light that emits light in a narrow band around a predetermined wavelength.

This arrangement makes possible the practical use of the half-wave plates. The half-wave plates work best with collimated light, since the path length in the cell will not be constant for light with a directional dispersion. This would result in an excessively narrow angle of view if used in a conventional LC construction, a problem solved by the phosphors of the present invention. Moreover, cholesteric mirrors only work at a predetermined wavelength, and these can usefully be converted to light at a variety of frequencies for a colour display using the invention.

A specific embodiment of the invention will now be described, purely by way of example, by reference to the accompanying Figure.

A UV light source 1 such as a mercury arc lamp is provided approximating to a point source and emitting light in a narrow band around a wavelength of 365 nm. This light is incident on a lens 3 which produces collimated light. Alternatively a diffuse source may be used with a collimator such as any of those described in the application WO95/27920 mentioned above, for instance.

The collimated light is then incident on the first cholesteric mirror 5, which is a right handed cholesteric mirror consisting of a layer of a mixture of a nematic and a chiral substance in planar alignment between two glass plates. The mirror is appropriately chosen to match the wavelength of the incident light, i.e. 365 nm. This right handed mirror passes only left hand circularly polarised light and reflects the right hand circularly polarised light.

In a refinement of this arrangement a mirror may be provided in the path of this reflected light. The position of the mirror can be arranged to reflect the light back on to the first cholesteric mirror. Since the mirror reverses the handedness of the circular polarisation, the twice reflected light now passes through the cholesteric mirror. This arrangement increases the effective brightness of the source.

The now left hand polarised light is then incident on the liquid crystal cell 7. The liquid crystal cell is a planar aligned liquid crystal cell having transparent sheets 21 with transparent electrodes 23 on one surface of each. Orientation layers 25 are provided located on the sheets and electrodes. The orientation layers are made from a suitable polymer rubbed in the same predetermined direction to orient the layers. A nematic liquid crystal 27 is sandwiched between the transparent sheets 21 and their orientation layers 25. The thickness of the liquid crystal layer is about 5½ μm, which satisfies equation (1) above with i=1, the birefringence Δn=0.1, a typical value, and the wavelength λ=365 nm.

Light that passes through the liquid crystal is then analysed by a second cholesteric mirror 9, that in this case is left-handed so that it only passes right hand polarised light.

When there is no voltage applied across the liquid crystal cell 7 by means of the electrodes 23 the liquid crystal is oriented by the orientation layers. In this state the liquid crystal has a birefringence, i.e. the light of polarisation parallel to and perpendicular to the liquid crystal orientation encounters different refractive indices. The thickness of the cell has been chosen so that in this example, with i=1 in the equation above, light parallel to the orientation of the liquid crystals is out of phase by 3/2 times a full cycle with respect to light perpendicular to this orientation, i.e. reversed in sign. This reversal results in a reversal of the direction of circular polarisation, from the left hand polarised light passed by the first cholesteric mirror 5 to the right hand polarised light emerging from the liquid crystal cell 7.

This right hand polarised light is then transmitted by the second cholesteric mirror 9, and is incident on a photoluminescent screen consisting of a glass substrate 11 covered in a phosphor material 12 that emits visible light when struck by W, for example doped zinc sulphide. The screen therefore emits visible light.

When a voltage is applied across the liquid crystal cell by means of the electrodes 23 the liquid crystal becomes homeotropic, so that the left hand polarised light that emerges from the first cholesteric mirror 5 does not suffer any reversal and remains left handedly polarised. This light is reflected by the second cholesteric mirror 9 and therefore no light reaches the screen 11 which then does not emit visible light.

Large arrays of these cells can be built up, as described in WO95/27920. For most applications the light source and collimator can be shared by all the cells, though in principle it is possible to have a separate source and collimator for each pixel.

The favourable voltage-transmission curve of the cell described above makes it possible to multiplex large numbers of cells. In this approach single transistors at the edge of a row of cells are used to drive selected cells in the row as is commonplace in liquid crystal displays.

What is claimed is:

1. A display element having a modulator for circularly polarised activation light, comprising: a light source for providing activation light in a narrow band around a predetermined wavelength a liquid crystal cell (7) switchable between two states, in one of which it reverses the handedness of incident light and in the other of which it does not affect the handedness, a filter (9) for passing only that part of the light from the liquid crystal cell (7) that has a predetermined handedness, and a screen (11, 12) which emits visible light when the activation light passed by the filter is incident upon it.

2. A display element according to claim 1 and further including a second filter (5) on the input side of the liquid crystal cell (7) for passing only a predetermined handedness of the input light to the cell.

3. A display element according to claim 2, in which the filters (5,9) are cholesteric mirrors.

4. A display element according to claim 3, in which the cholesteric mirrors have opposite handedness.

5. A display element according to claim 1, in which the liquid crystal (27) is nematic.

6. A display element according to claim 5, in which the liquid-crystal cell has a twist angle, preferably between 90° and 270°.

7. A display element according to claim 5, in which the liquid crystal is of the parallel planar aligned type.

8. . A display element according to claim 1, in which the light source emits UV light.

9. A display element according to claim 8, in which the screen includes phosphors (12) which respond to the UV light.

10. A display element according to claim 1, in which the light source also including a means (3) for collimating the light towards the liquid crystal cell.

* * * * *